United States Patent [19]

Berger et al.

[11] Patent Number: 5,239,300
[45] Date of Patent: Aug. 24, 1993

[54] OPERATING UNIT FOR MANUAL CONTROL OF A PLURALITY OF FUNCTIONS IN DIFFERENT APPARATUSES

[75] Inventors: Reimar Berger, Düsseldorf; Markus Börgens, Erkrath-Unterfeldhaus, both of Fed. Rep. of Germany

[73] Assignee: Telehotel-TV-Systeme GmbH, Dusseldorf, Fed. Rep. of Germany

[21] Appl. No.: 601,762

[22] PCT Filed: Dec. 13, 1989

[86] PCT No.: PCT/DE89/00765

§ 371 Date: Oct. 16, 1990

§ 102(e) Date: Oct. 16, 1990

[87] PCT Pub. No.: WO90/06739

PCT Pub. Date: Jun. 28, 1990

[30] Foreign Application Priority Data

Dec. 16, 1988 [DE] Fed. Rep. of Germany ....... 3842365

[51] Int. Cl.⁵ ................... G08C 19/00; H04B 1/03
[52] U.S. Cl. ........................ 341/176; 455/128
[58] Field of Search ............. 341/176; 455/128; 379/53, 110; 358/254

[56] References Cited

U.S. PATENT DOCUMENTS

| | | | |
|---|---|---|---|
| 3,054,024 | 9/1962 | Dillen et al. | 455/128 |
| 3,942,751 | 3/1976 | Fay | 248/593 |
| 3,995,123 | 11/1976 | Wilson | 379/110 |
| 4,183,015 | 1/1980 | Drew et al. | 340/825.06 |
| 4,647,980 | 3/1987 | Steventon et al. | 358/254 |
| 4,688,262 | 8/1987 | Schaefer et al. | 455/128 |
| 4,715,059 | 12/1987 | Cooper-Hart et al. | 379/53 |
| 4,794,381 | 12/1988 | Iwai | 358/254 |
| 4,825,200 | 4/1989 | Evans et al. | 341/176 |
| 4,857,898 | 8/1989 | Smith | 341/176 |
| 4,866,434 | 9/1989 | Keenan | 341/176 |
| 4,999,622 | 3/1991 | Amano et al. | 341/176 |

FOREIGN PATENT DOCUMENTS

| | | |
|---|---|---|
| 1690160 | 5/1971 | Fed. Rep. of Germany . |
| 3513817 | 10/1986 | Fed. Rep. of Germany . |
| 8625831 | 6/1988 | Fed. Rep. of Germany . |
| 8708646 | 12/1988 | Fed. Rep. of Germany . |
| 848360 | 9/1960 | United Kingdom . |

*Primary Examiner*—Glen R. Swann, III
*Attorney, Agent, or Firm*—Herbert Dubno

[57] ABSTRACT

An operating unit for the manual control of a plurality of functions of different apparatuses, especially for hospitals or hotels, has a modular design and comprises a box-like main module and at least one slat-like submodule. At least one device, the function of which is controlled by manual key operation, is arranged in or at the main module. Accessory devices can be arranged within the submodules. The unit is characterized by comfortable handling and great versatility.

13 Claims, 4 Drawing Sheets

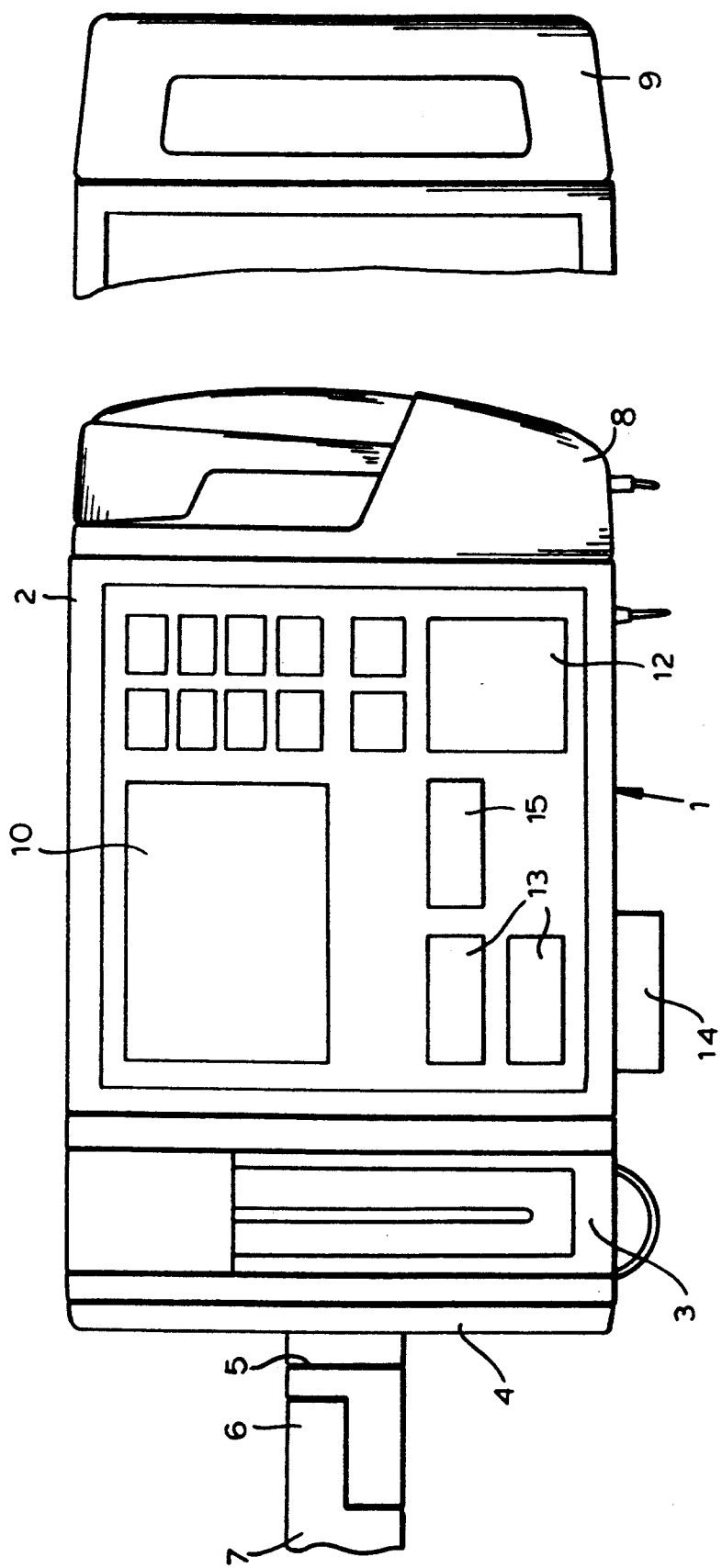

OPERATING UNIT FOR MANUAL CONTROL OF A PLURALITY OF FUNCTIONS IN DIFFERENT APPARATUSES

FIELD OF THE INVENTION

The present invention is directed to an operating unit for the manual control of a plurality of functions of different apparatuses, especially for hospitals or hotels.

THE RELATED ART

Operating units are known which comprise a housing, a plurality of keys for function control at the housing and wiring in the housing for the transmission of signals to the apparatuses and possibly for the processing of signals.

Such operating units are, for instance, referred to as remote control units for television receivers etc. Here, a single device is controlled by the operating unit. Furthermore, in hospitals operating units are known with which for instance hospital beds can be adjusted. Also in this case the operating unit is exclusively intended for the control of a single device. Dependent on the kind of the control, these units are either completely independent from the device which has to be controlled or are connected with the same by means of corresponding cables. Furthermore, it is known in hospitals or hotels to provide stationary operating means with which for instance radios or television receivers can be controlled and signals can be transmitted in order to call service or nursing staff. The present invention emanates from such stationary operating means.

The invention is based on the problem to provide an operating unit of the cited kind which has a good adaptability with regard to the available space and a simple rational construction and which can be used and varied or extended in an especially versatile manner.

SUMMARY OF THE INVENTION

According to the invention this problem is solved by an operating unit of the cited kind which is characterized by the features that it is formed as a movable unit or as a unit which can be moved in a limited manner, the housing is of a modular design and comprises a box-like main module having a plurality of function keys and at least one further replaceable slat-like submodule laterally mounted to the main module in a removable manner, the submodule being formed either as intermediate module or as end module, at least one device is located in or at the main module the function of which being controlled by manual key operation, and the submodule contains also a device the function of which is controlled by manual key operation, and/or an independent accessory device.

Accordingly, the inventive solution is based on the principle to design the operating unit as movable independent unit or independent unit movable in a limited manner, analogous to the known mobile control units, so that the user can use the unit at any point of a room. This can be attained on the one side by designing the unit as completely movable operating unit which has at most a cable connection to a stationary point, or as operating unit mounted at a holding device according to which the holding device allows corresponding degrees of freedom for the movement of the operating unit. The last-cited solution, according to which the operating unit is mounted at a holding device, has the advantage that the unit has not to be held manually if, for instance, the function keys are actuated or further functions of the unit are utilized. Accordingly, this solution is prefered and is especially suited for hotels or hospitals according to which the operating unit is pivotally mounted in such a manner that it can be used by the patient in the hospital bed or by the hotel guest in the hotel bed. The patient or guest has the possibility to move the operating unit into a position which is comfortable for him to use. Needless to say that the holding device has to allow a corresponding possibility of movement of the unit. This will be discussed later on.

Furthermore, the inventive solution is characterized by the feature that the housing of the operating unit has a modular design. For this, a box-like main module is used at which at least one slat-like submodule is removably mounted. These submodules are replaceable so that different submodules can be connected to a main module. Furthermore, the submodules are designed either as intermediate module or as end module so that also a plurality of submodules, one behind the other, can be mounted at a main module. By this design it is possible to produce standard members which can be assembled to corresponding complete units, dependent on the special requests.

A further essential aspect of the invention consists in the feature that the operating unit is formed as combined unit with which not only remotely located apparatuses are operated but also devices housed in the operating unit itself can be controlled, as for instance a television receiver or a radio. Furthermore, according to the range of application accessory devices are housed in the operating unit which are not controlled by means of the existing function keys but which are independent thereof. The accessory devices are located in the submodule or in a plurality of submodules.

Accordingly, by the inventive solution a plurality of devices and operating functions are housed in a single unit which has a very high mobility and adaptability with regard to the respective case of application. Various variants of the unit can be manufactured with the modular principle according to the standardized construction of the unit, i.e. subdivision into a main module and submodules. Differently formed main modules can be combined with different submodules in whatever manner.

Preferably, the box-like main module has an upper and a lower shell which are fastened to one another in a suitable manner. A combined plug or clamping and screwing connection are preferred fastening possibilities for the submodule. This kind of connection allows a rather simple mounting and demounting of the submodule and guarantees a safe fixation of the same at the main module. The clamping or plug connection is realized by the arrangement of projecting clamping flanges at the corresponding lateral surface of the main module as well as the lateral surface of the submodule, said clamping flanges, in clamping engagement, gripping into depressions of the corresponding opposite surface. Accordingly, when the submodule is put on the main module, at first the submodule is plugged on the corresponding clamping flanges so that a clamping connection is realized. Thereafter, the submodule is finally fastened to the main module by means of screws penetrating the corresponding lateral surfaces.

Dependent on their function and the device which is housed in the same the submodules have different shapes. However, on the whole they are designed in a slat-like manner and have the same height as the main module so that the submodules are in alignment with the main module above and below after their mounting. The width of the submodules is different dependent on the unit and function. There are intermediate modules and end modules, dependent on the question whether a plurality of submodules is to be located one behind the other or whether the submodule is the end member of a row. However, on principle all the submodules are shaped in an approximately C-like manner, in cross-section, and, with the edge flanges, grip over clamping flanges projecting from the lateral surface of the main module and spaced from the edge so that the edge flanges of the submodule and the front and back surfaces of the main module are flush. Accordingly, after the assembling a uniform box-like structure results which is comprised of the box-like main module and at least one slat-like submodule. Of course, submodules can be arranged on both sides of the main module. If submodules are arranged only on one side, preferably an end module is disposed on the opposite side of the main module. However, for this case also the main module itself can be provided with a suitable end wall.

When the submodule is formed as end module, the edge flanges merge perpendicularly into an end wall or cover wall, while according to the embodiment as intermediate module the wall flanges merge perpendicularly into an intermediate wall which is provided with corresponding projecting clamping flanges which are spaced from the edge. A further submodule can be joined by means of these clamping flanges.

As mentioned above, the final connection of the modules is preferably made by means of screws. In the end walls or intermediate walls corresponding bores are provided for the arrangement of the screws, or the modules have holding plates which are provided with screw bores. These holding plates can have a limited extension in order to not reduce the space existing in the modules.

Accordingly, "terminals", for instance for patients or hotel guests, can be combined in the above-cited manner. As example for the construction of such terminals the following is cited: For example, the main module can comprise a TV screen, at least one loudspeaker, the function keys and a card input/output unit. The function keys are preferably formed as key matrix. This key matrix can contain the corresponding operating keys for a LCD color television receiver and a radio. Furthermore, a special call key is preferably provided with which staff can be called. Dependent on the kind and number of the present submodules, the main module has furthermore corresponding function keys for the operation of the devices housed in these submodules. If, for instance, a submodule is formed as a lampholder with lamp, the main module has one or a plurality of function keys for the operation of this lamp. According to a further preferred embodiment of the invention a submodule is formed as a telephone with corresponding holder. The corresponding key field for the telephone can be arranged at the main module either, however, can be also located at the submodule, i.e. at the telephone handset itself. Further function keys at the main module are for instance operating keys for the above-mentioned card input/output unit. By means of this unit for instance codes can be input which actuate certain devices. Furthermore, operating keys for a printer can be provided.

The above-mentioned devices and functions are examplary only. It is evident that the inventive operating unit is not limited thereto. So, the operating unit can contain or have a plurality of further devices and functions which can be disposed either in the main module or in the submodules. Examples herefor are: further call keys for menu selection, film selection etc., operating keys for an intercommunication unit, connection possibilities for a data exchange with diagnosis apparatuses, a reading device for EEPROM cards, operating keys for external devices or functions, as for instance the room light, the room heating etc., an integrated camera (CCD) for the supervision of patients, connections for a remote diagnosis, temperature diagnosis, further card readers etc.

As already mentioned above, an especially preferred solution of the inventive operating unit has a holding device for the mounting at a wall etc. which is formed as hinge linkage. This holding device is to enable the operating unit to be fixed in a manually adjusted position and also serves to guarantee a freedom of movement of the operating unit as great as possible. For this, the hinge linkage or the pivot arm has preferably four hinges of which one hinge is located at the positioning location of the linkage on a wall etc. The second hinge is an intermediate hinge while the third and fourth hinges are arranged in the form of a double hinge at the connection point between linkage and operating unit. This double hinge enables a turning of the operating unit about its horizontal axis and its vertical axis. The connection between the hinge linkage and the operating unit is realized such that a corresponding end module has a central bore in which a pivot pin of the double hinge is pivotally, but fixably mounted in the corresponding position of rotation. By this, the unit can be turned about its horizontal axis. The pivot pin has in its extension a pivot disk arranged perpendicularly with respect thereto and pivotally cooperating with another pivot disk at the linkage. The operating unit can be pivoted about its vertical axis or about a vertical axis in the space by means of this hinge.

It is evident that further embodiments with regard to the holding device are possible. Dependent on the respective requirements a more or less greater freedom of movement of the operating unit can be attained.

In order to prevent the holding device from being torn out from its point of fixation if corresponding outer forces are applied on the operating unit (if for instance a patient supports himself at the operating unit) the hinge linkage is fastened to a wall etc., preferably by means of a gas pressure device, which counters the forces tearing at the operating unit.

A further alternative of the invention is characterized in that the holding device for the fastening of the unit at a wall etc. is mounted at the back side of the main module. In this case, the back side of the main module has preferably an elevation at which a linkage arm of the holding device is fixed. Advantageously, the mounting is realized by a metal plate located on the elevation by means of which and by means of the corresponding housing member of the main module the linkage arm is screwed. The mounting point is preferably pivotally formed so that the unit can be turned relative to the linkage arm and can be also pivoted, wherein especially a ball-and-socket joint is used which allows pivoting in all directions. The mounting of the unit at the back side of the main module has the advantage that the arrangement of further submodules is not interfered with hereby.

BRIEF DESCRIPTION OF THE DRAWING

In the following the invention is discussed in detail by means of an example in connection with the drawing wherein:

FIG. 1 shows a front view of an inventive operating unit;

FIG. 1a shows an alternative for the design of a submodule in the operating unit of FIG. 1;

DETAILED DESCRIPTION

Figure 2A:
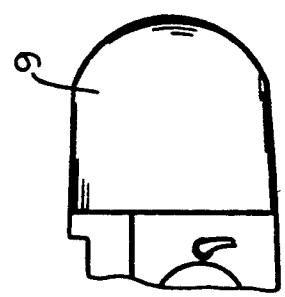
FIG. 2a shows an alternative for the design of a submodule in the operating unit of FIG. 2 in a view from below.
Figure 2:
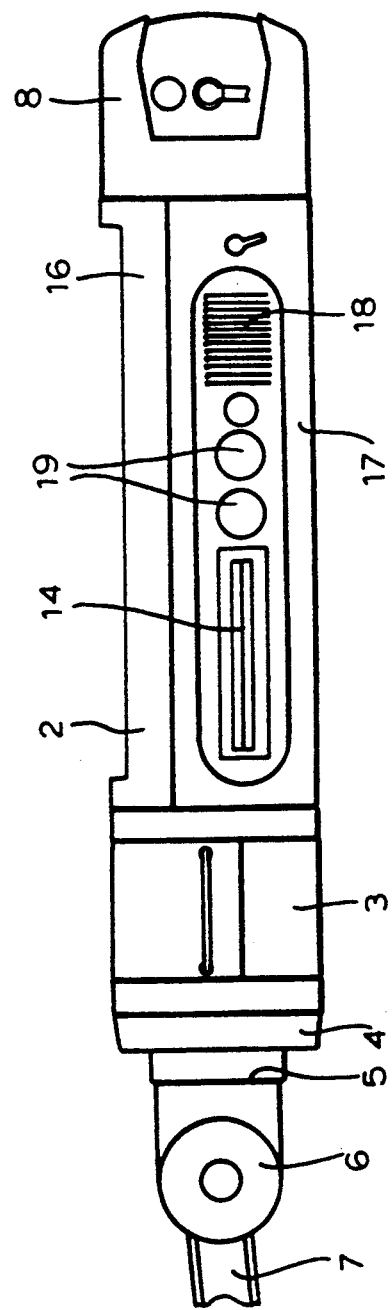
FIG. 2 shows a view of the operating unit of FIG. 1 from below.

Firstly, it is refered to the FIGS. 1 and 2. The operating unit 1 shown in these figures has a housing in which several devices or a corresponding wiring are disposed. This housing is fixed at a wall or something like that by means of a linkage 7. The linkage is formed such that the operating unit has a freedom of movement as great as possible.

The housing of the operating unit 1 consists of a box-like main module 2 and three slat-like submodules 3, 4 and 8. These submodules are laterally mounted at the main module 2, wherein the submodules 4 and 8 form end modules while the submodule 3 is formed as intermediate module. With 9 a further submodule is designated which is formed as handle and can be used instead of the submodule 8.

In the assembled condition, the main module 2 forms with the submodules 3, 4 and 8 a unitary compact housing which has approximately the shape of a box, as especially shown in the view from below of FIG. 2. The several housing parts, i.e. modules, are made from a plastic material suited herefor. Such materials are known to the expert in the art and are not mentioned in detail herein. As one can further observe from FIGS. 1 and 2, the modules are positioned one next to the other in such a manner that plane front, back and lateral surfaces result. The corresponding edges are preferably rounded in order to get a better handling and appearance of the unit. Furthermore, especially the front and back surface can have a slight bulging.

Figure 3:
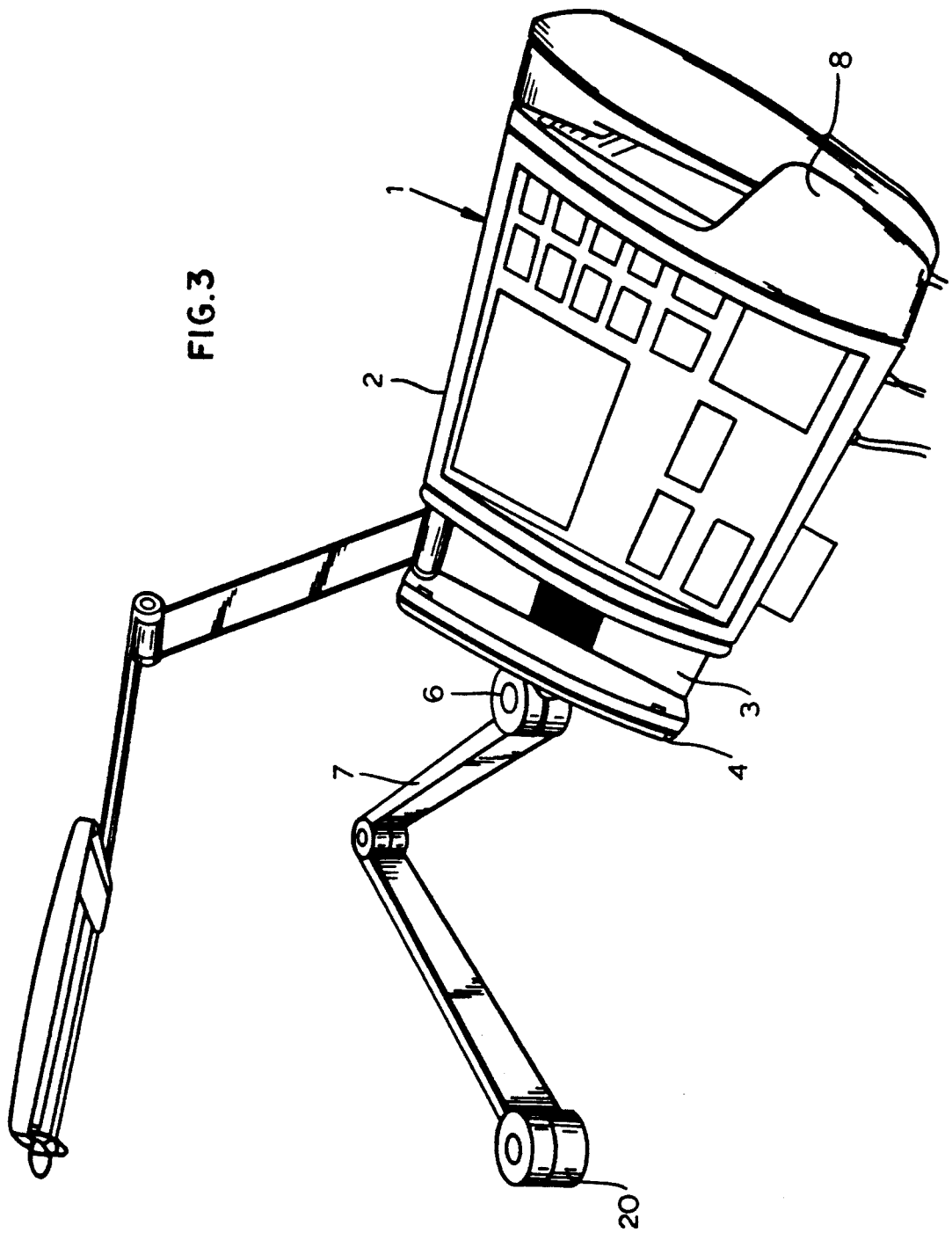
FIG. 3 shows a perspective view of the operating unit of FIGS. 1 and 2 in the pivoted condition in the swung out condition of the holding linkage.

The main module 2 is comprised of an upper shell-like member 16 and a lower shell-like member 17, as shown in FIG. 2. A screen 10 for a LCD color television receiver, a key matrix 11 containing several operating keys for the color television receiver as well as a radio, a call key 12 for service or nursing staff, two light keys 13 and a receipt key 15 are arranged on the front surface of the upper shell-like member 16. A card input/output unit 14, several plug-connections 19 for cable and a loudspeaker 18 are located on the lower side of the main module 2. A lamp which is received in the submodule 3 or which is formed as submodule 3 can be operated with the operating keys 13. This submodule 3 is comprised of a lampholder and the true lamp which can be swung off the holder, as this is shown in FIG. 3. In the swung-in condition the lamp fits completely in the operating unit so that its handling is not deteriorated thereby.

The submodule 8 which is arranged on the right side of the main module 2 is formed as telephone, wherein the lower part of the submodule in the figure is outwardly extended and forms a corresponding holder for the telephone handset. Instead of such a telephone also a simplified submodule can be provided which has the shape of a handle, as shown at 9.

A further submodule 4 which is formed as end module and includes the connection for the holding device 7 of the operating unit is located on the left side of the submodule 3 in FIG. 1. For this, the submodule 4 has centrally an outwardly projecting annular flange into which a pivot pin of a hinge 5 is inserted. In this manner, the operating unit can be manually turned around its horizontal axis. The pivot pin merges into a further hinge 6 by means of which the operating unit can be turned around a vertical axis. The exact construction of the corresponding hinge linkage will be discussed in connection with the FIGS. 3 and 4.

Figure 4:
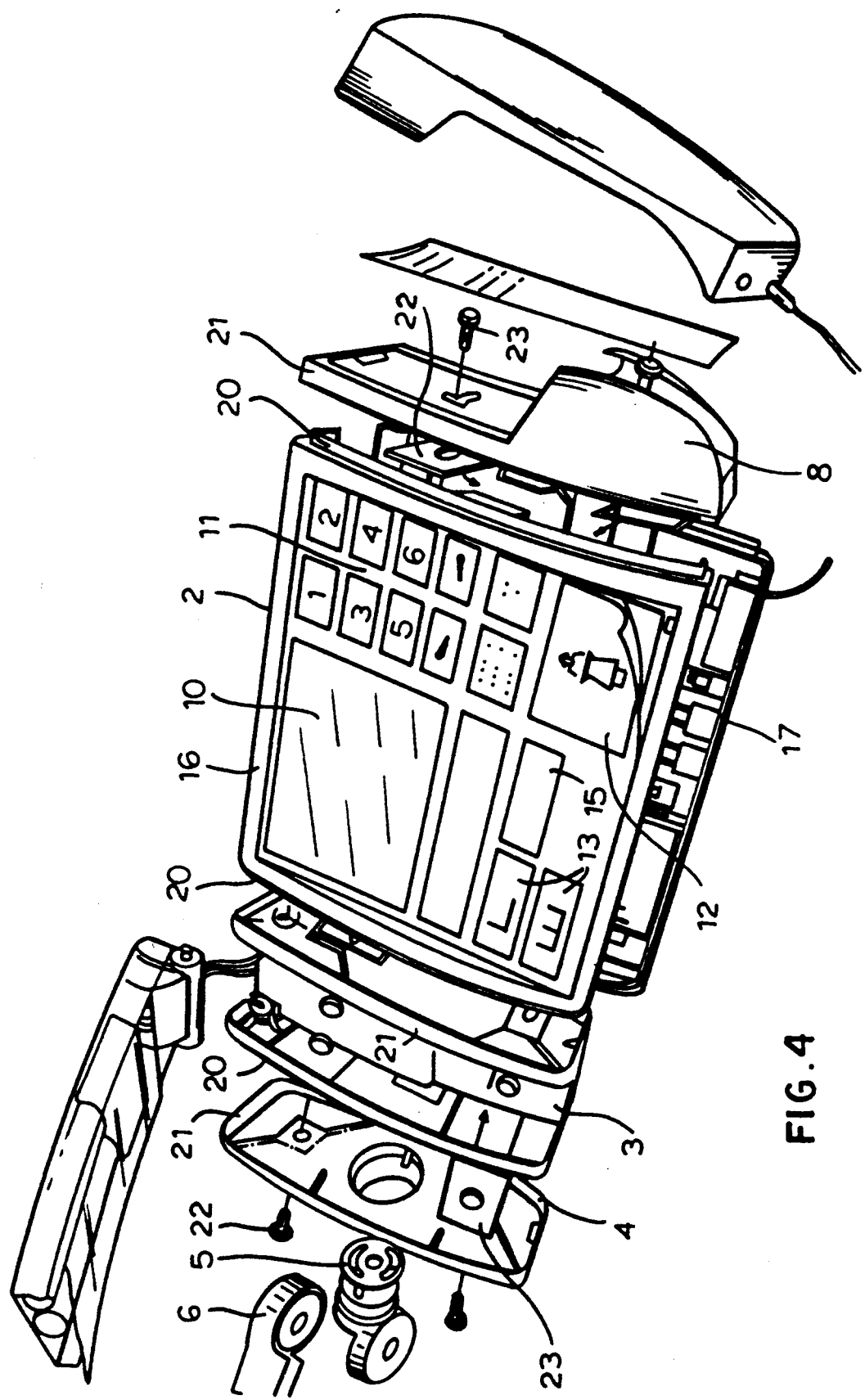
FIG. 4 shows an explosion view of the operating unit of FIGS. 1 to 3.

FIG. 4 shows the construction of the operating unit 1 in detail. As one can observe from this figure, the several members, i.e. the two shells 16 and 17 of the main module 2 and the submodules 3, 4 and 8, are placed one besides the other by means of plug or clamping connections in connection with screwing connections. The connection of the submodules with the main module as well as the connection of the submodules with one another is realized by projecting clamping flanges 20 located at the corresponding lateral surfaces and clampingly engaging into recesses at the adjacent part. Accordingly, if a submodule is joined to the main module, the submodule has to be only plugged onto the lateral surface of the main module so that the corresponding clamping engagement between the clamping flanges and the recesses or depressions is realized. In FIG. 4 a clamping flange 20 is shown on the right lateral surface of the main module over which an edge flange 21 of the submodule 8 is engaged. After the submodule 8 has been positioned over the clamping flange 20, the final fastening is realized by means of screws 23 which engage into corresponding bores in the walls or plates 22 of the main module and submodule.

If the submodule is formed as intermediate module, as this is shown with the module 3 carrying the lamp, the same has on the one side a clamping flange 20 which is offset backwardly with respect to the edge and on the other side an end flange 21, wherein in the shown example the edge flange 21 grips over a clamping flange 20 provided on the associated lateral surface of the main module 2 while the clamping flange 20 located on the opposite side of the submodule is gripped over by an edge flange 21 of the corresponding end module 4. These members are screwed with one another in a corresponding manner after the assembling step.

The hinge linkage 7 for holding the operating unit is best shown in FIG. 3. It comprises two linkage portions which are separated by a central hinge. As mentioned above, one hinge is located at the fastening point of the linkage at a wall etc. and a corresponding double hinge is located at the connection point with the operating unit. The linkage portion and the corresponding hinge portions are hollow so that cables can be directed therethrough into the interior of the operating unit, as shown at 20.

In the preceding specification an operating unit having a modular construction has been discussed. However, the invention is furthermore directed to such a unit having a single housing in which or at which all the members of the operating unit are mounted. According to the invention the unit has a box-like housing which is provided with the plurality of function keys, wherein at least one device the function of which is controllable by manual operation of the function keys and at least one accessory device or such an accessory means independent therefrom are located in the housing. Accordingly, with such a unit in a single housing for instance a TV receiver, a radio, a telephone, a lamp, a card input/output unit etc. are integrated.

Furthermore, in the preceding specification it was mentioned that the operating unit is formed as movable unit or as unit which can be moved in a limited manner. However, the invention concerns also cases according to which the operating unit is suited for a stationary installation, for instance in a bed-side table, the back of a bus chair etc. Furthermore, the invention is directed to cases according to which a unit which is stationarily installed can be moved in a limited manner, for instance can be swung out from a depression or can be tilted about its horizontal axis in order to facilitate the handling and operating of the unit.

As already mentioned, the submodules described-above can be also formed as pure cover plate for the main module in the simplest case. Accordingly, the term "accessory device" which these submodules contain is to also cover all possible accessory means in the broadest sense which fulfil any function, as for instance cover plates, holding devices, grip means, stands etc.

The holding device for the operating unit can be also designed in the shape of a stand. Two stands at both sides of the unit can be also arranged.

A headphone connection or an intercommunication unit can be also provided instead of a loudspeaker or in addition to a loudspeaker.

The term "slat-like" used above in connection with the submodules is to be also understood in a broad sense. This term is to cover even such submodules which possibly have a larger width than height. However, such cases will be seldom and concern especially such cases of application according to which additional diagnosis devices are provided at the operating unit. In this connection, the invention suggests also that the unit has at least one plug-on module which can be plugged either onto the main module or onto a submodule and which can be removed again without detaching a permanent connection (screwing connection). This embodiment is especially suited for diagnosis devices which can be plugged onto the operating unit as additional devices.

It is evident that all the above-cited embodiments can be used with the operating unit with modular design and with an operative unit having a single box-like housing. All the embodiments are not only suited for the mobile unit or for the unit which is mobile in a limited manner but also for the stationarily located unit.

We claim:

1. An operating unit for manual control of a plurality of functions of different devices comprising:
   a housing which is of a modular design at least partially movable relative to an operator thereof;
   wiring in said housing for transmission of signals to said devices;
   a box-like main module formed within said housing;
   a plurality of function keys for control located on said main module;
   at least one replaceable slat-like submodule formed within said housing and adapted to be removably fastened to a lateral surface of said main module in end-to-end relationship therewith, said submodule being formed either as an intermediate or as an end module;
   at least one device being disposed within said main module, said device being controlled by manual key operation through one of said function keys; and
   a further device being disposed within said submodule, said further device being controlled through a manual key operation with another one of said function keys or being an independent accessory device, said main module and submodule being fastened to one another by means of projecting clamping flanges and cooperating depressions, said flanges and depressions being arranged along respective lateral surfaces of said main module and submodule, said submodule having an approximately C-like cross-sectional shape and being formed with edge flanges along a perimeter thereof, said edge flanges gripping over said clamping flanges projecting from said lateral surface of said main module, and said submodule being spaced from an edge of said lateral surface so that said edge flanges of said submodule and of front and back faces of said main module are flush.

2. The operating unit according to claim 1 wherein said edge flange merge into an end wall or cover wall for the formation of said submodule as said end module.

3. The operating unit according to claim 1 wherein said edge flanges perpendicularly merge into an intermediate wall which is provided with corresponding projecting clamping flanges at a location spaced from said edge to allow formation of said module as said intermediate module.

4. An operating unit for manual control of a plurality of functions of different devices comprising:
   a housing which is of a modular design at least partially movable relative to an operator thereof;
   wiring in said housing for transmission of signals to said devices;
   a box-like main module formed within said housing;
   a plurality of function keys for control located on said main module;
   at least one replaceable slat-like submodule formed within said housing and adapted to be removably fastened to a lateral surface of said main module in end-to-end relationship therewith, said submodule being formed either as an intermediate or as an end module, said replaceable slat-like module having the same height as said main module and, after fastening to said main module, being in alignment with the main module along a top and bottom to form substantially continuous surfaces with said main module along said top and bottom;
   at least one device being disposed within said main module, said device being controlled by manual key operation through one of said function keys; and
   a further device being disposed within said submodule, said further device being controlled through a manual key operation with another one of said function keys or being an independent accessory device, said main module being designed on both lateral sides thereof for mounting of said submodules, said operating unit further having holding plates with screw bores, said plates being provided along sides of at least one of said main module and submodule for receipt of screws.

5. An operating unit for manual control of a plurality of functions of different devices comprising:
- a housing which is of a modular design at least partially movable relative to an operator thereof;
- wiring in said housing for transmission of signals to said devices;
- a box-like main module formed within said housing;
- a plurality of function keys for control located on said main module;
- at least one replaceable slat-like submodule formed within said housing and adapted to be removably fastened to a lateral surface of said main module in end-to-end relationship therewith, said submodule being formed either as an intermediate or as an end module, said replaceable slat-like module having the same height as said main module and, after fastening to said main module, being in alignment with the main module along a top and bottom to form substantially continuous surfaces with said main module along said top and bottom;
- at least one device being disposed within said main module, said device being controlled by manually key operation through one of said function keys; and
- a further device being disposed within said submodule, said further device being controlled through a manual key operation with another one of said function keys or being an independent accessory device, said main module comprising a TV screen, at least one loudspeaker or headphone terminal, said function keys and a card input/output unit.

6. The operating unit according to claim 1 wherein said submodule is formed as a telephone with a holding device.

7. The operating unit according to claim 5 wherein said submodule is formed as a lamp holding device with a lamp.

8. The operating unit according to claim 5 wherein said end module is formed as a handle.

9. An operating unit for manual control of a plurality of functions of different devices comprising:
- a housing which is of a modular design at least partially movable relative to an operator thereof;
- wiring in said housing for transmission of signals to said devices;
- a box-like main module formed within said housing;
- a plurality of function keys for control located on said main module;
- at least one replaceable slat-like submodule formed within said housing and adapted to be removably fastened to a lateral surface of said main module in end-to-end relationship therewith, said submodule being formed either as an intermediate or as an end module, said replaceable slat-like module having the same height as said main module and, after fastening to said main module, being in alignment with the main module along a top and bottom to form substantially continuous surfaces with said main module along said top and bottom;
- at least one device being disposed within said main module, said device being controlled by manual key operation through one of said function keys; and
- a further device being disposed within said submodule, said further device being controlled through a manual key operation with another one of said function keys or being an independent accessory device, said operating unit, further comprising a means for fastening said housing onto a wall and which is formed as a hinge linkage.

10. The operating unit according to claim 9 wherein said hinge linkage has four hinges.

11. The operating unit according to claim 9 wherein said housing is connected with said hinge linkage by means of a double hinge enabling turning of said housing about a horizontal axis and a vertical axis.

12. The operating unit according to claim 9 wherein said housing is fastened to said hinge linkage by means of said end module, said linkage being rotatably mounted with a pivot pin in an axial bore of said end module.

13. The operating unit according to claim 9 wherein said holding device for fastening to a wall is formed as a bendable tube.

* * * * *